L. W. SERRELL.
FAUCET.
No. 173,242. Patented Feb. 8, 1876.
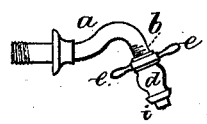
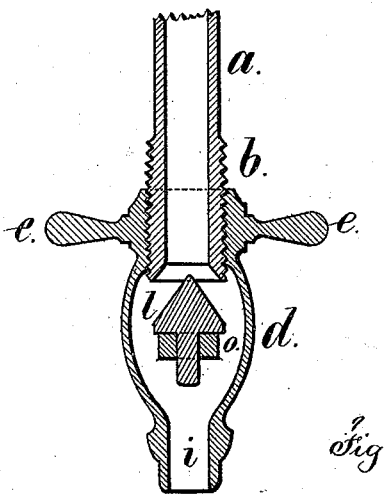
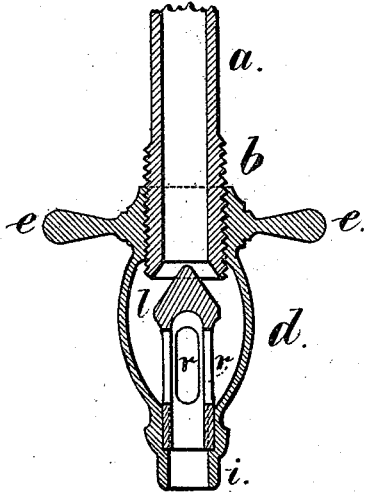
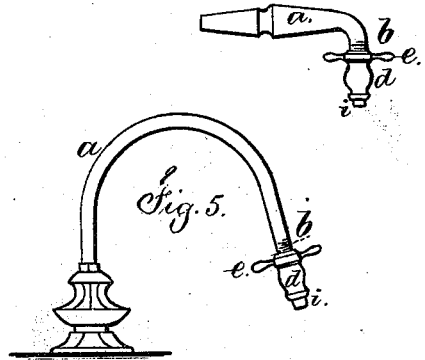
Witnesses,
Chas. H. Smith
Harold Serrell
Inventor
Lemuel W. Serrell

UNITED STATES PATENT OFFICE.

LEMUEL W. SERRELL, OF PLAINFIELD, NEW JERSEY.

IMPROVEMENT IN FAUCETS.

Specification forming part of Letters Patent No. 173,242, dated February 8, 1876; application filed July 19, 1875.

*To all whom it may concern:*

Be it known that I, LEMUEL W. SERRELL, of Plainfield, in the county of Union and State of New Jersey, have invented an Improvement in Faucets, of which the following is a specification:

Faucets with a valve and screw are well known, but the screw is liable to wear out rapidly, and the packing around the valve-stem becomes leaky. Screw-sleeves are also well known.

My invention relates to a screw-nozzle and valve applied at the end of the supply-pipe, and constructed with the screw of the nozzle in the rear of the issuing water, so that there is not a back pressure tending to force the water out through the screw, and the valve is constructed so that the same does not deflect the water toward the screw, but the water rushes past the valve and is delivered through an orifice in line, or nearly so, with the supply-pipe.

In the drawing, Figure 1 is a vertical section of the improved faucet. Fig. 2 is an elevation of the valve separately. Fig. 3 is a sectional plan of the hollow valve-stem, and Fig. 4 is a section of a modification in the valve-support.

The water or other liquid is supplied by the pipe $a$, and in a basin-cock or butler's pantry-cock such pipe rises above the slab and curves over and downward, as illustrated by Fig. 5, and in a bib-cock or wash-tray or tub cock the said pipe $a$ extends out horizontally, and turns downward, as in Fig. 6, or as a compound curve, as in Fig. 7.

In all instances the screw-thread at $b$, or its equivalent, is around the pipe $a$, near the end thereof, and the end of the said pipe is sufficiently conical to form the valve-seat.

The nozzle $d$ is screwed upon the pipe $a$, and it is preferably made with short handles $e$ $e$, by which it can be revolved. The lower end of this nozzle is in line, or nearly so, with the pipe $a$, and forms the delivery-tube $i$, and said tube should be sufficiently long to give direction to the water, and cause it to issue in a uniform stream.

The valve $l$ is supported within this nozzle. It is conical or tapering, and the space around this valve and within the nozzle is to be of as large an area as the sectional area of the pipe $a$, so that the water will pass the valve freely, and there will be little or no back pressure toward the screw $b$, but on the contrary the issuing jet of water will, by its momentum, tend to draw air through between the screw-threads, if they fit loosely; hence, there will not be any tendency for water to pass through the screw. I remark, however, that a packing may be applied around the end of the tube $a$ of smaller diameter than the screw, and passing into a plain portion of the nozzle $d$, if so desired.

The valve $l$ may have a stem resting in a cross-bridge, $o$, as seen in Fig. 4; but it is preferable to make the valve-stem a tube, as seen in Figs. 1, 2, 3, and of an internal diameter as large as the issuing-tube $i$, and resting in a cylindrical seat above such issuing-tube $i$, and in this tube are slits or openings $r$ of greater area than the sectional area of the said tube $a$, so that the flow of water will not be obstructed, but it will rush past the valve $l$ when that is screwed away from the end of the tube $a$, but when the nozzle is rotated to force the valve against the end of the tube $a$ the water is effectually stopped. The valve can be easily ground into place by taking off the nozzle and removing the valve, and when the valve is dropped back into the nozzle it assumes its place ready for the nozzle to be screwed upon the tube.

This faucet is very cheap to construct, being composed only of two parts, and it can be kept easily in repair, and may be used wherever available.

With basin-faucets, if it is not screwed tightly, any leakage drops into the basin.

Conical and flat valves screwed against the seat, through which the liquid issues, are well known; and screw-sleeves and sliding sleeves, with bayonet-locks and with valves closing the water-way, are well known. In my faucet the rush of water prevents back pressure at the screw of the sleeve, and the valve, being loose, can be ground to place, and is self-adjusting in use.

I claim as my invention—

1. The screw-nozzle $d$ and delivery-tube $i$, in combination with a separate conical valve, that is supported and moved by the screw-sleeve, substantially as set forth.

2. The valve $l$, made with a tubular stem, containing openings $r$, in combination with the screw-nozzle, having a circular bearing for the tubular stem around the delivery-tube $i$, substantially as specified.

Signed by me this 16th day of July, A. D. 1875.

LEMUEL W. SERRELL.

Witnesses:
GEO. T. PINCKNEY,
HAROLD SERRELL.